(12) United States Patent
Zhang

(10) Patent No.: US 8,276,481 B2
(45) Date of Patent: Oct. 2, 2012

(54) DUAL RATIO SHEARING SYSTEM

(75) Inventor: Peiliang P. Zhang, Shrewsbury, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 65 days.

(21) Appl. No.: 13/018,761

(22) Filed: Feb. 1, 2011

(65) Prior Publication Data

US 2012/0192676 A1  Aug. 2, 2012

(51) Int. Cl.
*F16H 37/06* (2006.01)

(52) U.S. Cl. .................. 74/665 G; 74/665 GA; 74/331; 74/333

(58) Field of Classification Search ......................... None
See application file for complete search history.

(56) References Cited

U.S. PATENT DOCUMENTS

| | | | | |
|---|---|---|---|---|
| 2,290,089 A | * | 7/1942 | Bock | 180/247 |
| 2,314,833 A | * | 3/1943 | Keese | 74/665 GA |
| 2,431,727 A | * | 12/1947 | Bennett | 74/333 |
| 2,674,136 A | * | 4/1954 | Bryan | 74/665 T |
| 4,270,409 A | * | 6/1981 | Glaze et al. | 74/665 GA |
| 4,553,623 A | * | 11/1985 | Ohkubo | 180/247 |
| 5,372,419 A | * | 12/1994 | Hagiwara et al. | 366/100 |
| 7,823,492 B2 | | 11/2010 | Zhang | |

\* cited by examiner

*Primary Examiner* — Troy Chambers
*Assistant Examiner* — Valentin Craciun

(57) ABSTRACT

A dual drive system for driving a pair of parallel output shafts comprises a pair of idler shafts interposed between and mechanically coupled to the output shafts by a first gear train. An input shaft is aligned coaxially with and is rotatable independently of one of the idler shafts. The output shafts are driven at one speed by adjusting a clutch to directly couple the input shaft to the one idler shaft, and are driven at a second speed by adjusting the clutch to indirectly couple the input shaft to the one idler shaft via a second gear train and gears rotatable respectively on the input shaft and the one idler shaft.

7 Claims, 3 Drawing Sheets

DUAL RATIO SHEARING SYSTEM

BACKGROUND

1. Field of the Invention

Embodiments of the present invention relate to dual speed drive systems adapted to be used in various industrial applications, for example rotary shears employed to subdivide hot rolled products in continuous rolling mills.

2. Description of Related Art

A known dual speed drive system for rotary shears is disclosed in U.S. Pat. No. 7,823,492 B2. A drawback with this system is the need to reverse rotation of a drive motor when switching speeds.

SUMMARY

Briefly described, embodiments of the present invention addresses the drawbacks of the prior art by providing an innovatively redesigned dual speed drive system that can be switched from one speed mode to another without reversing rotation of a drive motor.

In exemplary embodiments, the dual speed drive system can alternatively drive a pair of parallel output shafts at one or the other of two different speeds. The system comprises a pair of idler shafts interposed between the output shafts. A first gear train mechanically couples the idler shafts to each other and to the output shafts. An input shaft is aligned coaxially with and is rotatable independently of one of idler shafts. A first gear and a second drive gear are respectively received on and are rotatable relative to the input shaft and the one idler shaft. A second gear train mechanically couples the first drive gear to the second drive gear. The second gear train is configured and arranged to effect rotation of the second drive gear in the same direction as and at a different speed from that of the first drive gear. A clutch assembly is adjustable between a first speed mode in which the input shaft and the one idler shaft are rotatably fixed to each other while allowing both shafts to respectively rotate independently of the first and second drive gears, and a second speed mode in which the input shaft and the one idler shaft rotate independently of each other while being rotatably fixed respectively to the first and second drive gears.

These and other objects, features, and advantages of the present invention will become more apparent upon reading the following specification in conjunction with the accompanying drawings.

DETAILED DESCRIPTION

Figure 1:
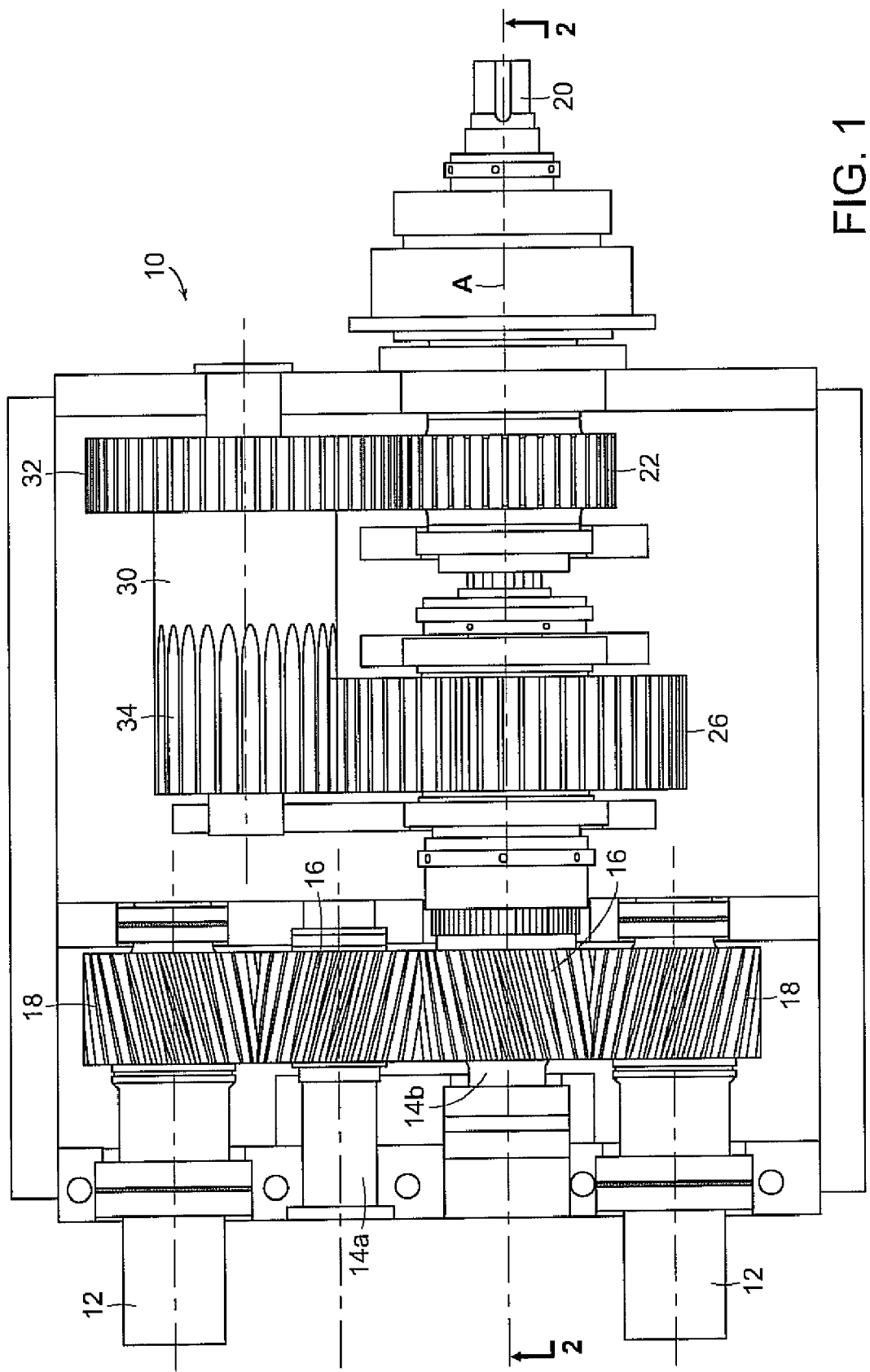
FIG. 1 is a plan view of a dual speed drive system, in accordance with an exemplary embodiment of the present invention.

To facilitate an understanding of embodiments, principles, and features of the present invention, they are explained hereinafter with reference to implementation in illustrative embodiments. In particular, they are described in the context of being a dual speed drive system.

Embodiments of the present invention, however, are not limited to use in the described systems. Rather, embodiments of the present invention can be used when a dual speed drive system is desired or necessary. Thus, the system described hereinafter as a dual speed drive system can also find utility as a system for other applications, beyond that of shearing system used to subdivide hot rolled products in continuous rolling mills.

The components described hereinafter as making up the various embodiments are intended to be illustrative and not restrictive. Many suitable components that would perform the same or a similar function as the materials described herein are intended to be embraced within the scope of embodiments of the present invention.

Referring now to the figures, wherein like reference numerals represent like parts throughout the views, embodiments of the present invention will be described in detail.

Figure 2:
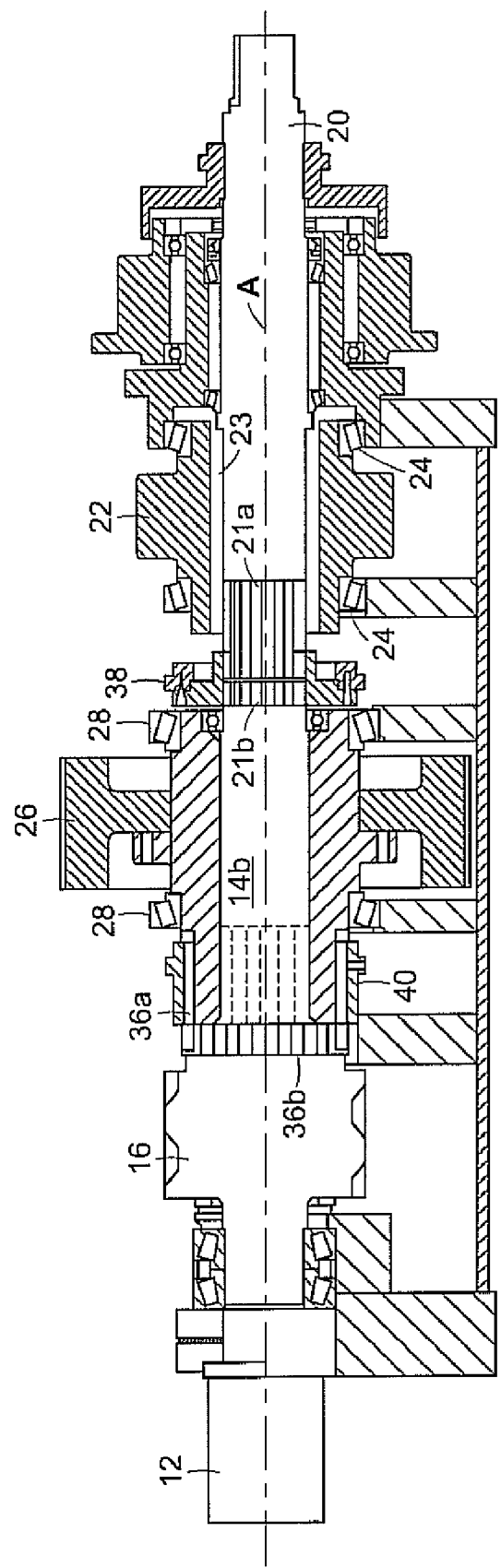
FIG. 2 is a cross-sectional view taken along line 2-2 of FIG. 1 showing the drive system in a first speed mode, in accordance with an exemplary embodiment of the present invention

Referring initially to FIGS. 1 and 2 illustrate a dual speed drive system 10 in accordance with aspects of the present invention. The drive system 10 is designed to power a pair of output shafts 12 having protruding ends on which shear blades or the like (not shown) can be mounted.

The drive system 10 comprises a parallel pair of idler shafts 14a, 14b interposed between the output shafts 12. A first gear train comprises idler gears 16 on the idler shafts and gears 18 on the output shafts 12. The first gear train can mechanically couple the idler shafts 14a, 14b to each other and to the output shafts 12.

An input shaft 20 is aligned coaxially with and can be rotatable independently of the idler shaft 14b. The shafts 20 and 14b are provided respectively with adjacent externally splined ends 21a, 21b.

A first drive gear 22 is received on the input shaft 20. The first drive gear 22 has internal splines 23 and is supported by bearings 24 for rotation independently of the input shaft 20.

A second drive gear 26 is received on idler shaft 14b, The second drive gear 26 is supported by bearings 28 for rotation independently of the idler shaft 14b.

An auxiliary shaft 30 can be positioned to one side of and parallel to the input shaft 20. First and second drive gears 32, 34 on the shaft 30 can be in permanent mesh respectively with the first and second drive gears 22, 26. The first and second drive gears 32, 34 comprise a second drive train configured and arranged to effect the rotation of the second drive gear 26 in the same direction as and at a different speed from that of the first drive gear 22.

The second drive gear 26 and the idler shaft 14b are provided respectively with adjacent external splines 36a, 36b.

Figure 3:
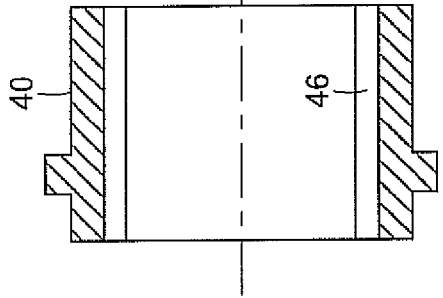
FIG. 3 is a cross sectional view of a first clutch member, in accordance with an exemplary embodiment of the present invention
Figure 4:
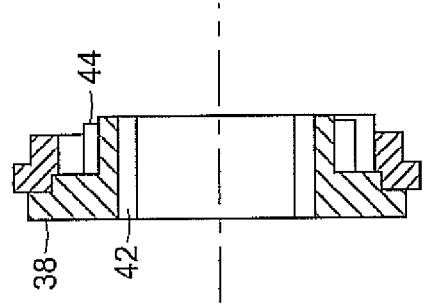
FIG. 4 is a cross sectional view of a second clutch member, in accordance with an exemplary embodiment of the present invention

A clutch assembly comprises first and second clutch members 38 and 40. As shown in FIG. 3, the first clutch member 38 has internal splines 42 and external splines 44, As shown in FIG. 4, the second clutch member 40 has internal splines 46.

The first and second clutch members 38, 40 are axially shiftable along the common axis "A" of shafts 20 and 14b between first and second speed modes In a first speed mode, as shown in FIG. 2, the internal splines 42 of the first clutch member 38 are meshed with the splined shaft ends 21a, 21b, thus establishing a direct drive that results in idler shaft 14b being rotated in the same direction and at the approximate same speed of input shaft 20. In this speed mode, the external splines 44 of the first clutch member 38 are out of the mesh with the internal splines 23 of the first gear 22, and the internal splines 46 of the second clutch member 40 are in mesh with only the external splines 36a of the second gear 26.

Figure 5:
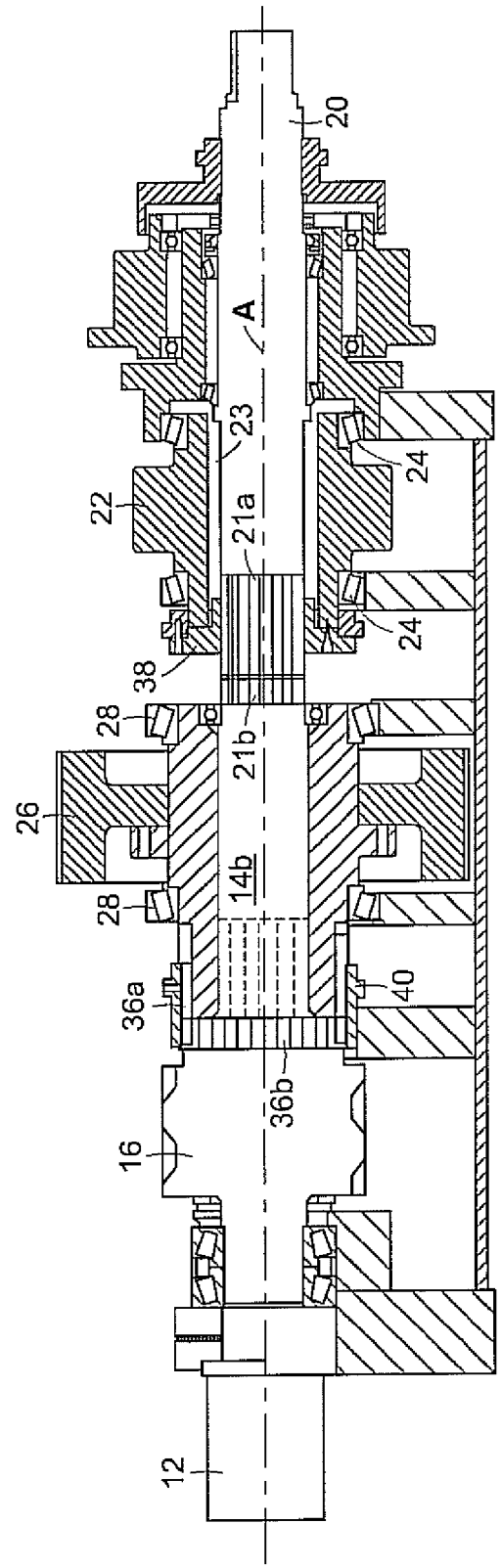
FIG. 5 is a cross-sectional view similar to FIG. 2, taken across line 2-2 of FIG. 1, showing the drive system in a second speed mode, in accordance with an exemplary embodiment of the present invention.

In a second speed mode, as shown in FIG. 5, the internal and external splines 42, 44 of the first clutch member 38 are meshed respectively with the splined end 21a of the input shaft 20 and the internal splines 23 of the first gear 22. The internal splines 46 of the second clutch member 40 are meshed with the external splines 36a and 36b of both the second gear 26 and the idler shaft 14b. Thus, the input shaft 20 and idler shaft 14b are independently rotatable, with shaft 14b being driven by the input shaft 20 via the second gear train in the same direction but at a different speed from that of the input shaft While exemplary embodiments of the invention have been disclosed many modifications, additions, and deletions can be made therein without departing from the spirit and scope of the invention and its equivalents, as set forth in the following claims.

What is claimed is:

1. A dual speed drive system for alternatively driving a pair of parallel output shafts at one or the other of two different speeds, the drive system comprising:
    a pair of parallel idler shafts interposed between the output shafts;
    a first gear train for mechanically coupling the idler shafts to each other and to the output shafts;
    an input shaft aligned coaxially with and rotatable independently of one of the idler shafts;
    first and second drive gears respectively received on and rotatable relative to the input shaft and the one idler shaft;
    a second gear train mechanically coupling the first drive gear to the second drive gear, the second gear train configured and arranged to effect rotation of the second drive gear in the same direction as and at a different speed from that of the first drive gear; and
    a clutch assembly adjustable between a first speed mode in which the input shaft and the one idler shaft are rotatably fixed to each other and are rotatable in the same direction and at the same speed in relation respectively to the first and second drive gears, and a second speed mode in which the input shaft and the one idler shaft are independently rotatable and rotatably fixed respectively to the first and second drive gears, whereby rotation of the input shaft results in rotation of the one idler shaft in the same direction and at a different speed from that of the input shaft.

2. The dual speed drive system of claim 1, wherein:
    the input shaft and the one idler shaft have axially adjacent externally splined ends,
    the first gear has internal splines, and
    the clutch assembly comprises a first clutch member having internal splines and external splines, the internal splines of the first clutch member being meshed with the externally splined ends of both the input shaft and the one idler shaft in the first speed mode, and the external splines of the first clutch member being meshed with the internal splines of the first gear in the second speed mode.

3. The dual speed drive system of claim 2, wherein in the first speed mode, the external splines of the first clutch member are out of mesh with the internal splines of the first gear.

4. The dual speed drive system of claim 2, wherein in the second speed mode, the internal and external splines of the first clutch member are in mesh respectively with the splined end of the input shaft and the internal splines of the first gear.

5. The dual speed drive system of claim 3, wherein in the second speed mode, the internal and external splines of the first clutch member are in mesh respectively with the splined end of the input shaft and the internal splines of the first gear.

6. The dual speed drive system of claim 2, wherein the second gear and the one idler shaft have axially adjacent external splines, and wherein the clutch assembly further comprises a second clutch member with internal splines, the internal splines of the second clutch member being meshed with the external splines of both the one idler shaft and the second gear in the second speed mode.

7. A dual speed drive system for alternatively driving a pair of parallel output shafts at one or the other of two different speeds, the drive system comprising:
    a pair of parallel idler shafts interposed between the output shafts;
    a first gear train for mechanically coupling the idler shafts to each other and to the output shafts;
    an input shaft aligned coaxially with and rotatable independently of one of the idler shafts, the input shaft and the one idler shaft having adjacent externally splined ends;
    first and second drive gears respectively received on and rotatable relative to the input shaft and the one idler shaft, the first drive gear having internal and external splines, and the second drive gear having external splines adjacent to external splines on the one idler shaft;
    a second gear train mechanically coupling the first drive gear to the second drive gear, the second gear train being configured and arranged to effect rotation of the second drive gear in the same direction as and at a different speed from that of the first drive gear; and
    a clutch assembly comprising first and second clutch members, the first clutch member having internal and external splines, and the second clutch member having internal splines, the clutch assembly being adjustable between a first speed mode in which the internal splines of the first clutch member mesh with the splined ends of both the input shaft and the one idler shaft, with the external splines of the first clutch member being out of mesh with the internal splines of the first gear and with the internal splines of the second clutch member being in mesh with only the external splines of the second gear, and a second speed mode in which the internal and external splines of the first clutch member mesh respectively with the splined end of the input shaft and the internal splines of the first gear, with the internal splines of the second clutch member meshed with the external splines of both the one idler shaft and the second drive gear.

* * * * *